Figure 1:
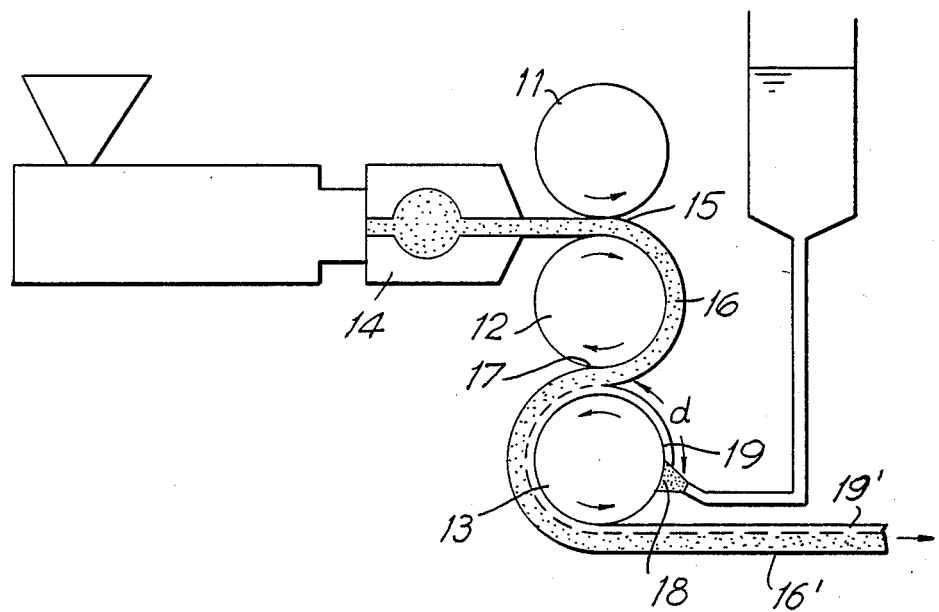

United States Patent [19]

Vetter et al.

[11] Patent Number: 4,921,669
[45] Date of Patent: May 1, 1990

[54] METHOD FOR COATING A CONTINUOUS TRAIN OF SYNTHETIC RESIN WITH A SCRATCH RESISTANT COATING

[75] Inventors: Heinz Vetter, Rossdorf; Werner Siol, Darmstadt-Eberstadt, both of Fed. Rep. of Germany

[73] Assignee: Röhm GmbH, Darmstadt, Fed. Rep. of Germany

[21] Appl. No.: 262,883

[22] Filed: Oct. 26, 1988

[30] Foreign Application Priority Data

Oct. 27, 1987 [DE] Fed. Rep. of Germany ....... 3736280

[51] Int. Cl.⁵ .............................................. B29C 47/88
[52] U.S. Cl. ..................................... 264/134; 264/1.6; 264/22; 264/171; 264/236; 264/280; 264/347; 264/348
[58] Field of Search ................. 264/83, 129, 134, 171, 264/236, 347–348, 280, 1.4, 1.6, 22

[56] References Cited

U.S. PATENT DOCUMENTS

| | | | |
|---|---|---|---|
| 3,812,074 | 5/1974 | Oswitch et al. | 264/255 |
| 3,848,045 | 11/1974 | Oswitch et al. | 264/255 |
| 3,978,178 | 8/1976 | Oshima et al. | 264/255 |
| 3,996,328 | 12/1976 | Coffin et al. | 264/280 |
| 4,021,172 | 5/1977 | Prinz | 425/325 |
| 4,100,243 | 7/1978 | Wissinger et al. | 425/131.1 |
| 4,271,103 | 6/1981 | McAlister | 264/83 |
| 4,294,782 | 10/1981 | Froehlig | 264/1.6 |
| 4,386,042 | 5/1983 | Tatebayashi | 264/135 |
| 4,415,509 | 11/1983 | Toyooka et al. | 264/347 |

FOREIGN PATENT DOCUMENTS

| | | |
|---|---|---|
| 10967436 | 5/1975 | Canada . |
| 10123374 | 10/1984 | European Pat. Off. . |
| 12058504 | 6/1972 | Fed. Rep. of Germany . |
| 22164176 | 7/1972 | Fed. Rep. of Germany . |
| 22448477 | 4/1974 | Fed. Rep. of Germany . |
| 12455175 | 5/1975 | Fed. Rep. of Germany . |
| 22803144 | 7/1979 | Fed. Rep. of Germany . |
| 23028562 | 3/1981 | Fed. Rep. of Germany . |
| 33203540 | 8/1982 | Fed. Rep. of Germany . |
| 33140316 | 4/1983 | Fed. Rep. of Germany . |
| 11466405 | 3/1977 | United Kingdom . |
| 22013132 | 8/1979 | United Kingdom . |

*Primary Examiner*—Jeffery Thurlow
*Attorney, Agent, or Firm*—Curtis, Morris & Safford

[57] ABSTRACT

A scratch resistant coating is applied to one or both surfaces of an extruded thermoplastic synthetic resin web by passing the web through a polishing roll stack wherein at least one of the rolls has thereon a film of a material forming such a scratch resistant coating, the coating being in this way transferred from the roll to the surface of the web.

15 Claims, 1 Drawing Sheet

METHOD FOR COATING A CONTINUOUS TRAIN OF SYNTHETIC RESIN WITH A SCRATCH RESISTANT COATING

The present invention relates to a method for making a synthetic resin web having a scratch resistant coating thereon by shaping a thermoplastic synthetic resin molding composition into a weblike strand and then shaping said strand into a web using a polishing roll stack having on at least one roll thereof a film of a material forming a scratch resistant coating on said molding composition.

THE PRIOR ART

The production in one operation of extruded synthetic resin webs having a scratch resistant coating is not known in the art.

What is know is subsequently to provide injection molded articles with a scratch resistant coating by dipping them into a solution of a material adapted to form a scratch resistant coating, evaporating the solvent, and curing the coating. In a second method described in German patent publication 24 55 715, a solution is used for this purpose which contains a compound susceptible of free radical polymerization and having at least three acrylic or methacrylic groups and an initiator forming free radicals. The subsequent coating has an adverse effect on the dimensional accuracy of the molded part. Moreover, the solvent contained in the coating solution may cause cracks in the plastic part.

According to German patent 20 58 504, a glass plate is coated with a liquid mixture adapted to cure to a scratch resistant coating resin. Then a plastic plate is laid on it with exclusion of air bubbles and the other, free, surface of the plastic plate is coated with the liquid mixture and overlaid with a second glass plate. The layers of the mixture are then cured and the glass plates are removed. While this technique does permit the production of dimensionally accurate plastic plates, it does not lend itself to the manufacture of differently shaped articles such as continuous plastic webs.

For the production of coated injection molded parts, European patent 123,374 proposes that after an injection molded part has been produced the mold be partly opened, a liquid composition be injected for formation of a surface coating, and the mold be reclosed. Through the rotary motion of the mold halves as the mold is being closed, the composition is distributed over the surface of the molded part and then cures. Apart from the fact that many injection molds would not permit rotary motions for distribution of the subsequently injected composition, the means for rotation would complicate the design of the mold and add to its cost.

In a number of further prior art methods which in the plastics arts are known as in-mold coating methods, molded parts with a scratch-resistant surface coating are produced by applying a scratch-resistant coating to the shape-imparting surface of an injection mold and injecting into the mold so prepared a curable composition for formation of the inner molded part and then curing it. Thus, in the first method described in German patent publication 24 55 715, a layer of a coating material is applied to the inner wall of the mold and photochemically cured under an oxygen free atmosphere. Then a monomer, for example, a methacrylate syrup, intended to form the molded article is injected into the mold and polymerized under predetermined conditions. The layer applied to the mold wall then bonds to the polymer being formed and after polymerization can be removed with it from the mold.

In a closely similar method disclosed in German patent publication 21 64 716, the coating applied to the inner wall of the mold is covered with a foil and cured by means of free radical initiators, which makes it possible to dispense with an oxygen free protective gas. After the coating has cured, the foil is removed and a monomer is introduced into the mold for the synthetic resin core and polymerized. A similar procedure is employed in the methods according to German patents 31 40 316 and 30 28 562, where after the mold walls have been coated with a colored material an unsaturated polyester resin is injected into the mold cavity and cured.

According to German patent 32 03 540, injection molded parts with a scratch resistant surface are produced by inserting in the injection mold a length of sheeting provided with a scratch resistant coating and then injecting a thermoplastic molding composition, which bonds to the length of sheeting under the pressure of the molding composition.

For the production of injection molded parts with a colored surface coating, it is proposed in German patent publication 28 03 144 to apply to the inside of an injection mold a varnish film and to cure it. Then the mold is to be closed and a molding composition is to be injected.

According to German patent 24 48 477, the inside of a heated mold is electrostatically coated with a powdered thermoplastic resin, which thus sinters to form a coherent film. A molding composition containing a blowing agent is then injected. A molded foamed plastic article is so obtained which has a surface coating of the thermoplastic material that has a higher scratch resistance than the foamed plastic article.

THE OBJECT AND THE INVENTION

All of these methods are suitable only for the manufacture of individual molded articles by the injection molding method or for the manufacture of individual plastic plates but do not lend themselves to the production of continuous plastic webs.

The invention has as its object to produce continuous plastic webs with a scratch resistant surface.

In accordance with the invention this object is accomplished by using a method in which a mold is coated with a material adapted to form a scratch resistant coating, molding an article in the mold, and then cooling the temperature of the article below its softening point, but wherein the "mold" is a polishing roll stack and the molding composition is shaped into a continuous synthetic resin web by the "molding" process, the material adapted to form a scratch resistant coating being applied to the surface of at least one of the rolls of the polishing stack.

In accordance with a preferred embodiment of the invention, a liquid mixture of at least one monomer susceptible of free radical polymerization and having more than one polymerizable double bond, and of at least one initiator which forms free radicals at the temperature of the roll surface or at the temperature of the thermoplastic molding composition or at a temperature between them, or under the action of ultraviolet radiation, is applied to the surface of at least one roll imparting shape to the composition for formation of the scratch resistant coating. Polymerization of the monomer or monomer sets in either at once or on contact with the molding composition and is completed before the synthetic resin web has cooled to a temperature below the softening point of the resin. The polymerization may be regarded as completed once a hard, scratch resistant coating is obtained, even if unconverted double bonds can still be detected in the coating.

Advantages of the invention

With the method of the invention, continuous plastic webs with a scratch resistant surface can be produced using commonly employed, existing polishing roll stacks. Conventional extrudable molding compositions without reactive groups can be used to produce the plastic webs. These advantages are achieved through steps that can be performed easily and quickly and do not unduly slow down the manufacturing process or add to its cost.

Use of the invention

The method of the invention lends itself to the production of continuously extruded plastic webs with a scratch-resistant surface on one side or on both sides. The width of the web is limited only by the width of the available polishing stack. The invention naturally finds its primary application in the production of webs with a high gloss surface, and especially webs of crystal clear plastics.

Suitable extrudable plastic molding compositions include polyethylene, polypropylene, polystyrene and polyvinyl chloride, for example. Preferred are polycarbonates, such as bisphenol A polycarbonate, and particularly acrylic glass, meaning homo- and copolymers of methyl methacrylate with over 80 percent of MMA.

Practice of the invention

The invention is based on the application of the so called in-mold coating technique to the production of extruded plastic webs by extrusion of a thermoplastic molding composition through a slot die into a flat web of a thickness ranging from 0.05 to 20 mm and a width of between 20 and 300 cm, for example, followed by polishing of the web in a polishing roll stack in which the web passes at least twice through a calibrated nip and is cooled in the process.

For the inventive coating of the roll surface, any material may be used that can be distributed as a melt, a solution, or a liquid curable resin over the roll surface to form a coherent coating, will bond to the thermoplastic molding composition when brought into contact with it, and will cure to a surface coating of adequate scratch resistance when cooled to a temperature below the softening point of the molding composition. "Scratch resistant" within the meaning of the invention are coatings which are harder than the molding composition from which the plastic web is formed. The hardness of the coating can be adapted to given requirements by the selection of appropriate known coating materials. When ultraviolet initiators are used, a material sufficiently permeable to UV radiation should be used.

In every case, the material adapted to form a scratch resistant coating contains an organic polymer, or precondensates or components for formation of such a polymer. Bonding may be enhanced, if desired, by the reaction of reactive groups in the coating with coreactive groups in the molding composition; however, such groups are not a requirement of the method of the invention. The material adapted to form the scratch resistant coating may acquire its hardness solely through the drying of a solution of the material or through the solidification of a melt.

In the time elapsing between the application of the coating to the roll surface and the cooling of the polished web to a temperature below the softening point of the thermoplastic molding composition, a curing reaction preferably occurs with formation of crosslinks within the coating. Crosslinking may take place by the reaction of hydroxyl or amino groups of the polymer or precondensate with coreacting groups of a polyfunctional crosslinking agent, such as amidomethylol groups, isocyanate groups, or oxirane groups, for example. A great many resin systems of this type are known, for example, phenol-formaldehyde resins, urea-formaldehyde resins, melamine resins, epoxy resins, and polyurethane resins.

As a material adapted to form a scratch resistant coating, a liquid mixture of at least one monomer susceptible of free radical polymerization and having more than one polymerizable double bond and of at least one initiator which forms free radicals under the action of ultraviolet radiation or at temperatures between the temperature of the roll surface and the temperature of the thermoplastic molding composition is preferably applied to the roll surface.

The monomer or monomers for formation of the scratch resistant coating have at least two but rarely more than six polymerizable double bonds. These may be present in acryloyl, methacryloyl, vinyl, allyl or methallyl groups. Preferred are esters of acrylic or methacrylic acid with polyhydric aliphatic alcohols. These usually contain from 2 to 10 carbon atoms and from 2 to 6 hydroxyl groups, all or some of which may be esterified. Illustrative of such monomers are ethylene glycol diacrylate and dimethacrylate, 1,2-propylene glycol diacrylate and dimethacrylate, 1,2- or 1,4-butylene glycol diacrylate and dimethacrylate, glycerol triacrylate and trimethacrylate, pentaerythritol tri- and tetraacrylate and methacrylate, trimethylolpropane triacrylate and trimethacrylate as well as the acrylic esters of dipentaerythritol. Since of the esters mentioned those of acrylic acid polymerize more rapidly and more completely than those of methacrylic acid, it will be highly advantageous to use only the acrylic esters, or then mixtures of acrylic and methacrylic esters in which the acrylic esters decidedly predominate and the methacrylic esters amount to not more than 30, and preferably not more than 15, percent by weight. Monomers with boiling points above 140° C. are preferred.

Of the polyfunctional monomers, those with three or more carbon-carbon double bonds result in particularly high crosslinking density, and hence in good scratch resistance. However, because of their usually high viscosity, they are difficult to process in pure form at room temperature. The viscosity can be reduced by including a quantity of difunctional monomers in the formulation. The addition of monofunctional monomers will serve the same purpose. While these will not contribute to crosslinking, they will result in increased flexibility of the scratch resistant coating. Illustrative of monofunctional monomers are styrene, acrylonitrile, methacrylonitrile, monoalkyl esters of acrylic and methacrylic acid having from 1 to 10 carbon atoms in the alkyl group, or having substituted alkyl groups carrying hydroxyl groups, for example, as substituents.

To obtain good processing viscosity and high flexibility of the scratch resistant coating, the proportion of the mono- and difunctional monomers may be increased to as much as 70 percent by weight of the monomer mixture, while the proportion of the tri- and polyfunctional monomers should not be less than 30 percent by weight to assure high scratch resistance. Surprisingly, the monomer mixture may contain up to 30 percent by weight of acrylic or methacrylic acid without adverse effect on the scratch resistance. The viscosity of the liquid monomer mixture, measured at 20° C., advantageously does not exceed 100 mPa·s.

In addition to or in place of the mono- or difunctional monomers, nonpolymerizable liquid volatile organic solvents may be used to obtain a good processing viscosity. These should largely or completely evaporate from the coating applied to the roll surface before it comes into contact with the thermoplastic molding composition. The unevaporated residue will gradually volatilize after the web has exited from the polishing stack.

To be able to evaporate, the solvent should have a boiling point lower than that of the monomers used. Advantageously its boiling point is below the temperature of the roll surface. Suitable organic solvents include aliphatic esters, ethers, ketones, chlorinated hydrocarbons and aromatic hydrocarbons, for example. Of the ketones, which are generally preferred, cyclohexanone is particularly well suited.

The function of the initiator forming free radicals is to cure, or harden, the coating of monomer mixture applied to the roll surface by polymerization. The cure may be completed before the coated roll surface comes into contact with the thermoplastic molding-composition web. In this case, the cured coating will not be displaced by the molding composition. However, the adhesion of the coating to the cooled molding composition is not always fully satisfactory. Better bonding is obtained if the polymerization of the coating is completed only when it is in contact with the molding composition. If polymerization of the coating has not progressed far enough by the time the latter comes into contact with the molding composition, there is the danger that the coating may be partly displaced from the roll surface. It is therefore advisable to adjust the speed of rotation of the polishing stack so that the time elapsing between the application of the monomer mixture to the roll surface and the latter's making contact with the thermoplastic molding composition is sufficient for a degree of polymerization at which displacement of the coating is avoided but adequate adhesion is secured.

When atmospheric oxygen is admitted to the polymerizing coating on the roll surface, polymerization is inhibited more markedly on the exposed surface of the coating than on the surface in contact with the roll surface. As a result, the coating is cured more or less completely at the roll surface whereas the other side remains in a partially polymerized state until air is excluded as the coating comes into contact with the molding composition and the cure goes to completion with formation of a good bond. If despite the desirability of this inhibitory effect of atmospheric oxygen the cure of the coating is to be completed before the latter comes into contact with the molding composition, it will be advisable to blow an inert gas onto the roll surface.

Especially well suited for the method of the invention are free radical forming initiators with a half-life of less than two minutes at 100° C. (see Ullmanns Enzyklopädie der technischen Chemie, 3rd ed., 1970, supplement volume, pp. 177–181), and in particular aliphatic peroxydicarbonates, including:
Diethyl peroxydicarbonate
Dichloroethyl peroxydicarbonate
Diisopropyl peroxydicarbonate
Diisobutyl peroxydicarbonate
Di(2-ethylhexyl) peroxydicarbonate
Dicyclohexyl peroxydicarbonate
Di(alkylcyclohexyl) peroxydicarbonate
Di(methylcyclohexyl) peroxydicarbonate
Di(tert-butylcyclohexyl) peroxydicarbonate
(In this connection, see also Swern, Organic Peroxides. John Wiley & Sons, vol. 1, 1970, pp. 68–73, and vol. 2, 1971, pp. 863–867.) Benzophenone, benzoin ether, omega-halogenated ketones such as trichloroacetophenone, benzil dialkyl ketals, thioxanthone derivatives, hydroxyalkyl phenones or diethoxy acetophenone, for example, may be used as ultraviolet initiators.

The initiators, such as the aforesaid peroxydicarbonates, are used in amounts of from 0.1 to 10, and more particularly from 1 to 7, percent by weight, based on the total weight of the monomer mixture. In addition to initiators with a half-life of less than two minutes, initiators having a half-life of over two minutes at 100° C. may be used in smaller amounts, for example, up to one-fifth of the amount of the first mentioned initiators. Examples are dilauroyl peroxide, tert-butyl peroxypivalate and dibenzoyl peroxide.

If desired, further additives may be admixed with the liquid monomer mixture, for example, flow control agents, anti-oxidants, antistatic agents or UV stabilizers. Commonly used non-polymerizable UV absorbers as listed in Ullmanns Enzyklopädie der technischen Chemie, 4th ed., vol. 15, pp. 253–260, may be employed. However, polymerizable UV absorbers, such as 3-(2-benzotriazolyl)-2-hydroxy-5-tert-octylbenzyl methacrylamide, are used to better advantage.

The material adapted to form the scratch-resistant coating, for example, the monomer mixture composed of monomers and initiators, and optionally of organic solvents and further additives, is applied to the roll surface in a coating thickness of from 1 to 100 microns, and preferably from 2 to 50 microns. A thinner coating would not assure scratch resistance, and a thicker coating would not improve the scratch resistance further but at most reduce the elasticity and adhesive strength of the coating. The rolls may be coated by means of applicator rolls, by knife coating or cast coating, and preferably by spraying.

Depending on whether the plastic web is to receive a scratch resistant coating on one side only or on both sides, the coating material is applied either to only one roll or then to one roll on each side of the plastic web. It is possible but generally not necessary to apply coating material to more rolls than one on a given side of the plastic web.

Referring to accompanying FIG. 1 depicting a conventional sheet extrusion apparatus, the coating material may be applied to the surfaces of the first pair of rolls 11, 12 which accommodate the thermoplastic web extruded from a slot die 14 in the nip 15 between them. Preferably, however, it is applied to one or two of the subsequent rolls 12, 13 so that it comes into contact with the plastic web only in the second nip 17 or third nip. This offers the advantage that there the surface of the web has already partially hardened and a higher gloss of obtained. The point of application 18 may optionally be located at such distance, d, from the nip 17 that the time elapsing before the applied coating comes in contact with the plastic web is sufficient to allow the solvent to evaporate or to allow partial or complete condensation or polymerization of the coating 19.

The temperature of the roll surface 13 will generally range from 40° to 180° C. The applied coating of monomer mixture will take on that temperature, unless it is lowered by evaporation of the solvent or raised with a heat lamp. In that temperature range, polymerization proceeds rapidly and may be completed within 5 to 600 seconds, especially when atmospheric oxygen is excluded. The preferred length of time between the application of the coating and the injection of the molding composition is between 1 and 20 seconds.

As soon as the coating has cured to the desired degree, it can be brought into contact with the plastic web in the molten and fluid or thermoelastic state. The final cure will take place during the time up to the cooling to a temperature below the softening point.

The quality of the scratch resistant coating 19' on the finished molded parts 16' will depend on the composition of the monomer mixture used, and particularly on the crosslinking density, the elasticity, and the adhesion to the molding composition substrate. With judicious choice of the composition, the scratch resistance will be equal or superior to that of high quality scratch-resistant coatings on a polysiloxane basis. The best coatings that can be produced by the method of the invention will not be scratched by grade 00 steel wool even with hard rubbing.

A better understanding of the present invention and of its many advantages will be made by referring to the following specific examples, given by way of illustration. In the examples, the following materials were used:
(A) Pentaerythritol tetraacrylate;
(B) 1,6 hexanediol diacrylate;
(C) Bis-4-tert.-butyl cyclohexyl peroxydicarbonate (half-life=1 min. at 90° C. to 1 hr. at 57° C.);
(D) Trimethylolpropane triacrylate;
(E) cyclohexanone (normal boiling point=155° C.). (Monomers (A), (B), and (D) all have a normal boiling point above 200° C.).

EXAMPLE 1

9.43 g. of a mixture of 56 weight percent of (A) and 44 weight percent of (B) were mixed in a beaker with 1.6 g. of an initiator solution. The latter consisted of 10.5 g of methyl ethyl ketone as solvent in which 1.6 g of (C) had been dissolved. The solution was introduced into the cup of a spraying apparatus and sprayed continuously with the aid of nitrogen as the carrier gas at a spraying pressure from 4 to 5 bar from a distance of 40 cm from in front of the second nip onto the surface of the third roll of a three roll polishing stack. The roll had a surface temperature of 120° C. and a rotational speed of 2 cm/sec, so that 15 seconds elapsed before the coating entered the second nip.

During this time, that side of the coating abutting the roll surface polymerized extensively, whereas that surface in contact with air polymerized only little. Also during this time the solvent evaporated extensively from the coating.

In the nip, the coated roll surface come into contact with a web of polymethyl methacrylate molding composition ("Plexiglas Y8N", clear) having a thickness of 3 mm and a surface temperature of 120° C. The web wrapped itself around the circumference of the roll for a length of 45 cm and then passed onto a level cooling track.

EXAMPLE 2

5.54 g of a monomer mixture composed of 21 weight percent of (A) and 79 weight percent of (D) were mixed with 2 weight percent of an initiator solution containing 6.6 g of (E) in which 16 weight percent of (C) had been dissolved.

Further processing was as in Example 1.

EXAMPLE 3

8 g of a monomer mixture composed of 56 weight percent of (A) and 44 g weight percent of (B) were mixed with 16 weight percent of an initiator solution consisting of 23.4 g of (E) and 9 weight percent of (B). The coating solution was applied as in Example 1. The surface temperature of the roll was 100° C.

In the nip, the coating was brought into contact with a web, 2 mm thick, of a polycarbonate molding composition ("Makrolon 2800") having a surface temperature of 150° C. The synthetic resin web so obtained had a scratch resistant coating with a thickness of 10 microns.

EXAMPLE 4

The procedure of Example 1 was repeated using a coating mixture of the following composition:
(A) 70 weight percent;
(B) 20 weight percent;
(C) 10 weight percent of dodecanediol dimethacrylate.

What is claimed is:
1. A method for providing a scratch resistant coating on a continuous synthetic resin web, which method comprises
   (a) shaping a thermoplastic synthetic resin molding composition into said continuous web in a polishing roll stack;
   (b) supplying a material forming said scratch resistant coating to at least one of the rolls of said stack to form a film of said material on said roll, said material being a liquid mixture of (1) at least one monomer susceptible of free radical polymerization and having more than one polymerizable double bond and of (2) an initiator which forms free radicals under ultraviolet radiation or at a temperature at or above the temperature of said coating roll and at or below the temperature of said thermoplastic synthetic resin molding composition;
   (c) contacting said continuous web of thermoplastic synthetic resin molding composition and said film of material formed on said roll when the monomer or monomers in the film on said roll has been partially polymerized;
   (d) wrapping said web, in contact with said film of material, partially around the circumference of said roll;
   (e) curing said film, in contact with said web and said roll, until said web has cooled to a temperature below the softening point of said thermoplastic synthetic resin molding composition; and
   (f) removing said cooled web, having said cured film thereon, from the surface of said roll.

2. A method as in claim 1 wherein said liquid mixture is applied to said coating roll when the latter has a temperature between 40° C. and 150° C.

3. A method as in claim 1 wherein said liquid mixture contains a volatile organic liquid.

4. A method as in claim 3 wherein said liquid has a boiling point below the boiling point of said monomer or monomers.

5. A method as in claim 4 wherein said organic liquid is not susceptible to free radical polymerization.

6. A method as in claim 3 wherein said mixture containing an organic liquid is sprayed onto the surface of said coating roll and said coating roll is brought into contact with said thermoplastic molding composition after said liquid has been substantially volatilized.

7. A method as in claim 1 wherein said monomer having more than one polymerizable double bond is a compound having more than one acryloyl group.

8. A method as in claim 7 wherein said liquid mixture wherein at least 70 mole percent of said polymerizable double bonds are present as acryloyl groups.

9. A method as in claim 7 wherein at least of portion of said acryloyl groups are present in a compounds having at least three acryloyl groups.

10. A method as in claim 1 wherein said monomer or monomers has a boiling point above 140° C.

11. A method as in claim 1 wherein said initiator has a half-life of less than two minutes at 100° C.

12. A method as in claim 11 wherein said initiator is an aliphatic peroxydicarbonate.

13. A method as in claim 1 wherein said thermoplastic molding composition has a temperature between 80° C. and 350° C. when contacted with said coating roll.

14. A method as in claim 1 wherein the monomer or monomers present in the film of material on said coating roll is exposed to atmospheric oxygen during its partial polymerization.

15. A method as in claim 1 wherein said thermoplastic molding composition is brought into contact with said coating roll from 1 to 20 seconds after said film of polymerizable monomer or monomers has been applied to the surface of said coating roll.

* * * * *